Oct. 10, 1939.   W. ADAMS   2,175,512
CULTIVATOR SHIELD REGULATOR
Filed Feb. 25, 1939   3 Sheets-Sheet 1
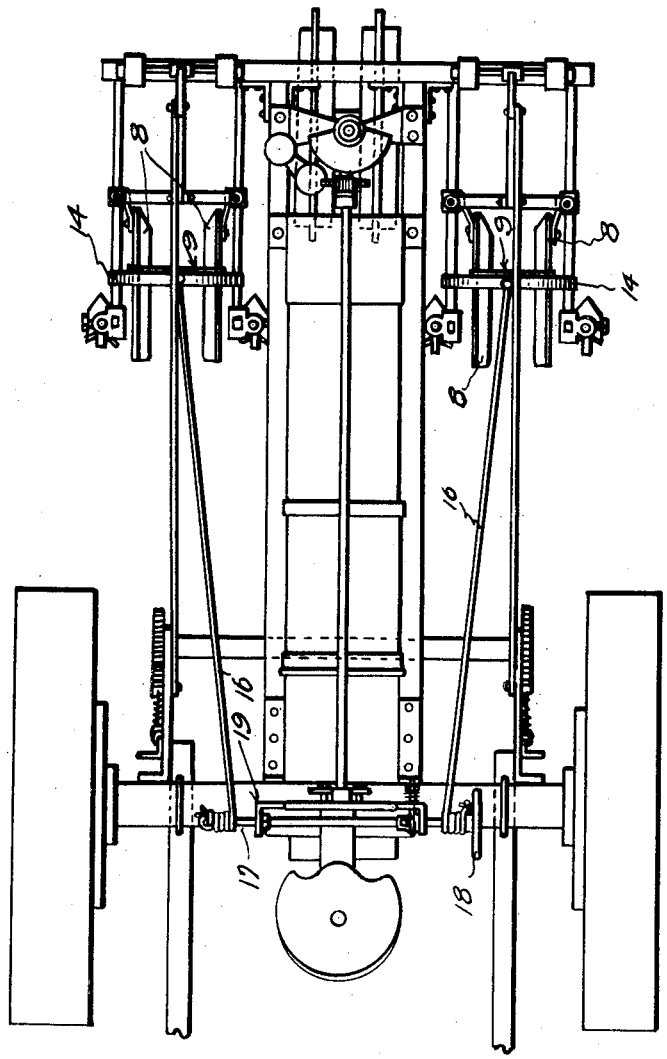
Inventor
Walter Adams
By Clarence A. O'Brien
and Hyman Berman
Attorneys

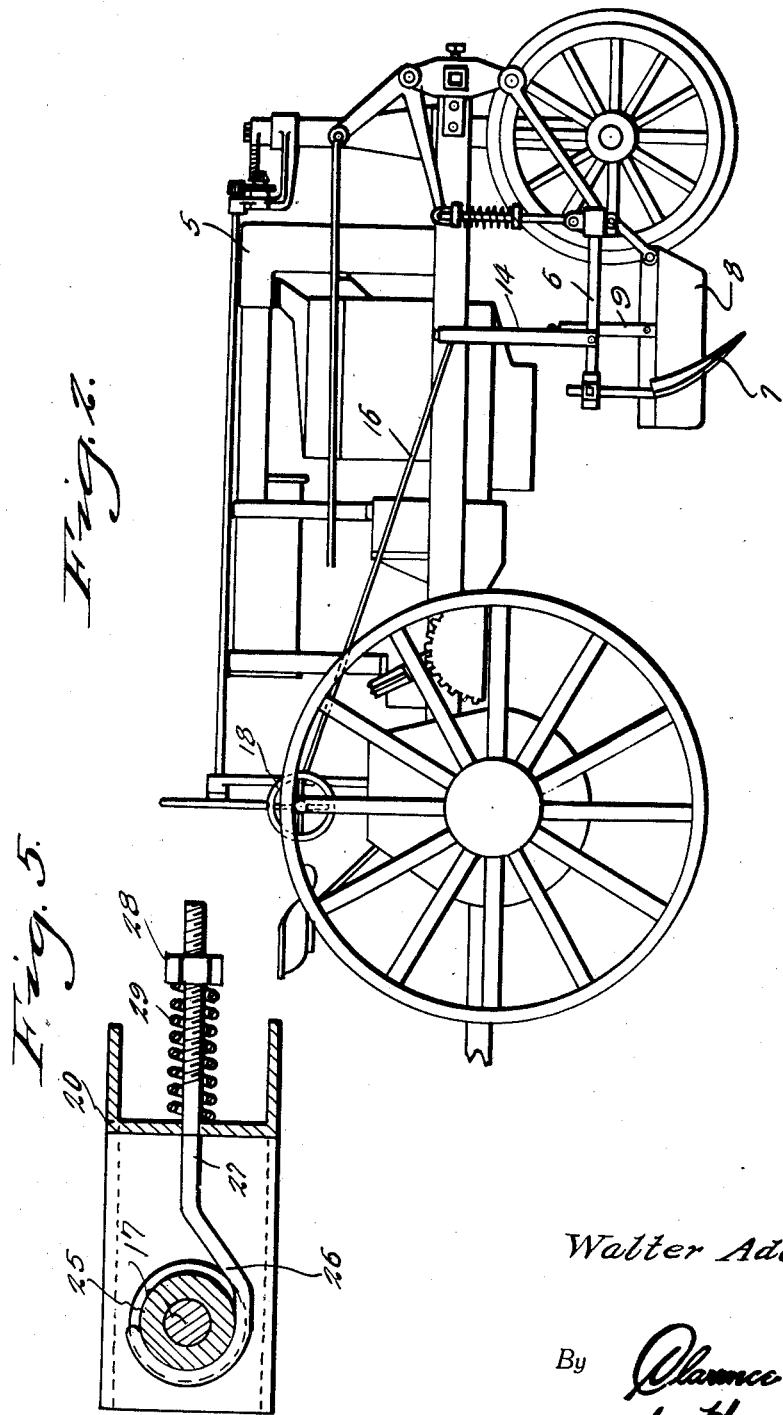

Oct. 10, 1939.  W. ADAMS  2,175,512
CULTIVATOR SHIELD REGULATOR
Filed Feb. 25, 1939  3 Sheets-Sheet 3
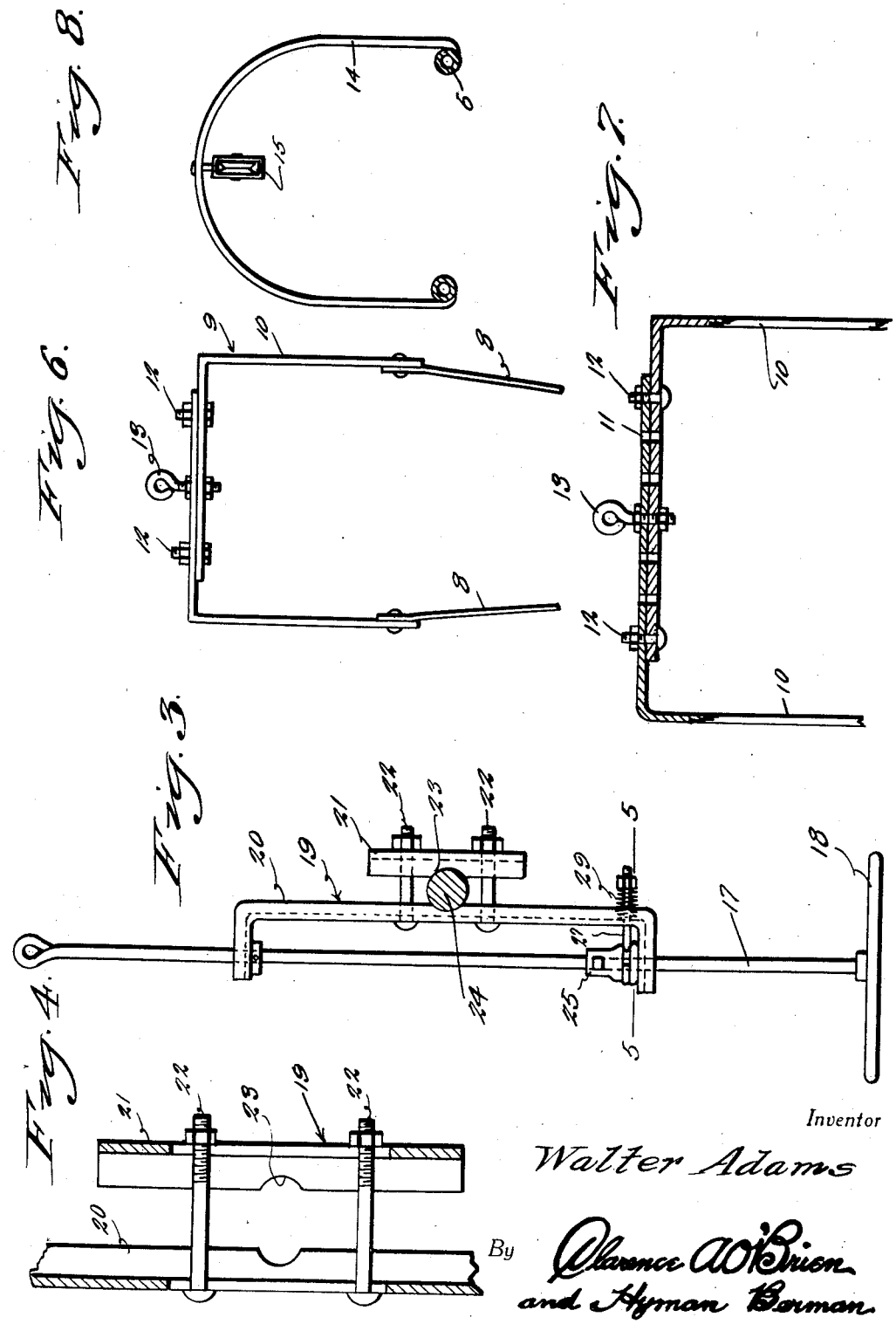
Inventor
Walter Adams
By Clarence A. O'Brien
and Hyman Berman.
Attorneys Patented Oct. 10, 1939

2,175,512

UNITED STATES PATENT OFFICE 2,175,512

CULTIVATOR SHIELD REGULATOR

Walter Adams, Yutan, Nebr.

Application February 25, 1939, Serial No. 258,545

1 Claim. (Cl. 97—47)

This invention relates to cultivator shield regulators, and has for the primary object the provision of a device of this character which may be easily and quickly installed on a tractor cultivator of the type having gangs of cultivating elements and shields therefor and which will permit the operator without interrupting the cultivating operation, to raise and lower the shields to meet different ground conditions so that the best cultivating operations may be had and which will maintain the shields in any of the positions in which they may be adjusted without manual attention.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a tractor cultivator equipped with a shield regulator constructed in accordance with my invention.

Figure 2 is a side elevation illustrating the same.

Figure 3 is a top plan view, partly in section, illustrating the means of mounting a portion of the present invention on the tractor and consisting primarily of the hand wheel and cable winding shaft.

Figure 4 is a fragmentary sectional view illustrating a portion of the clamp used for supporting the cable winding shaft on the tractor.

Figure 5 is a fragmentary sectional view illustrating a tensioning device, taken on the line 5—5 of Figure 3.

Figure 6 is a side elevation illustrating a connecting bracket for joining a pair of shields.

Figure 7 is a fragmentary vertical sectional view illustrating the bracket of said shields, and showing the means of adjustment thereto.

Figure 8 is a side elevation, partly in section, illustrating a pulley supporting bracket.

Referring in detail to the drawings, the numeral 5 indicates a conventional type of tractor on which are mounted gangs of cultivators 6, the cultivating elements of said gangs being indicated by the character 7. The gangs of cultivators are arranged for operation at opposite sides of the tractor and operating in conjunction with the cultivating elements 7 are shields 8 arranged in pairs. The pairs of shields are joined or connected together by brackets 9 each composed of L shaped elements 10, the horizontal portions of which are arranged in overlapping relation and provided with a series of openings 11 through which bolts 12 may extend for the purpose of permitting the pairs of shields to be adjusted toward and from each other. Also extending through the brackets 9 are eye bolts 13.

Mounted on the gangs 6 are substantially U-shaped brackets 14 on which are pivotally secured sheaves or pulleys 15 having trained thereover cables or flexible elements 16. The cables or flexible elements are secured to the eye bolts 13 and also are secured to and wound on an operating shaft 17 equipped at one end with a hand wheel 18 whereby the operator of the tractor may rotate the shaft 17 in opposite directions for the purpose of raising and lowering the shields in accordance with the unevenness of the ground over which the gangs of cultivators are passing.

A supporting bracket 19 consists of plates 20 and 21 detachably and adjustably connected by bolts 22 and having notches 23 in the opposed faces thereof to receive a post 24 or some other part on the tractor. The post 24 acts as a support for the usual steering mechanism of the tractor, as clearly shown in Figure 2. The supporting bracket 19 is arranged transversely of the tractor and the plate 20 thereof is of substantially U shape and its end portion provides journals for the shaft 17. The bracket 19 supports the shaft 17 transversely of the tractor with the hand wheel 18 to one side of the steering wheel of the tractor so that the operator may easily reach the hand wheel 18 for the purpose of rotating the shaft 17 in opposite directions to raise and lower the shields.

A grooved collar 25 is secured on the shaft 17 and the hook-shaped portion 26 of a tension rod 27 engages in the groove of said collar. The tension rod 27 is slidably mounted in the plate 20 of the bracket 19 and has threaded thereon a nut 28. A coil spring 29 is mounted on the rod 27 and bears against the plate 20 and the nut 28 and acts to draw the hook-shaped portion 26 tightly against the collar 25 to prevent accidental rotation of the shaft 17 and consequently brings about securing of the shields in any of their adjusted positions. This construction will permit the operator to readily adjust the shields to any desired height whenever desired by simply turning the hand wheel 18. The tension of the spring 29 may be increased and decreased by adjusting the nut 28 on the rod 27.

It is believed that the foregoing description, when taken in connection with the drawings will fully set forth the construction and advantages of this invention to those skilled in the art to which such invention relates, so that further detailed description will not be required.

Having thus described my invention, what I claim is:

In a device of the character set forth, a tractor cultivator including gangs of cultivating elements and shields therefor arranged in pairs, brackets connected to said shields, flexible elements connected to said brackets, brackets mounted on said tractor cultivator, pulleys carried by said last-named brackets and having the flexible elements trained thereover, a bracket mounted on the tractor, an operating shaft rotatably supported by the last-named bracket and having the flexible elements secured thereto and wound thereon, a hand wheel secured to said shaft, a grooved collar secured to said shaft, a rod having a hook-shaped portion engaging in the groove of said collar and slidably supported by the last-named bracket, and a spring means acting on said rod to tension said shaft.

WALTER ADAMS.